US010180022B1

(12) United States Patent
Garg et al.

(10) Patent No.: US 10,180,022 B1
(45) Date of Patent: Jan. 15, 2019

(54) HINGE ASSEMBLY TO PIVOTABLY MOUNT BLIND FLANGE TO PIPE WELD NECK FLANGE

(71) Applicants: Ram Garg, Missouri City, TX (US); Prabin K. Shrestha, Katy, TX (US)

(72) Inventors: Ram Garg, Missouri City, TX (US); Prabin K. Shrestha, Katy, TX (US)

( * ) Notice: Subject to any disclaimer, the term of this patent is extended or adjusted under 35 U.S.C. 154(b) by 0 days.

(21) Appl. No.: 15/456,387

(22) Filed: Mar. 10, 2017

(51) Int. Cl.
| *E05D 5/06* | (2006.01) |
| *E05D 3/02* | (2006.01) |
| *F16J 13/20* | (2006.01) |
| *F16L 55/10* | (2006.01) |
| *E05D 5/02* | (2006.01) |
| *E05D 11/02* | (2006.01) |

(52) U.S. Cl.
CPC ............... *E05D 5/06* (2013.01); *E05D 3/02* (2013.01); *E05D 5/02* (2013.01); *F16J 13/20* (2013.01); *F16L 55/1018* (2013.01); *E05D 11/02* (2013.01); *E05Y 2900/602* (2013.01)

(58) Field of Classification Search
CPC .... E05D 3/02; E05D 5/02; E05D 5/06; E05D 5/065; F16J 13/18; F16J 13/20; F16L 55/1018
See application file for complete search history.

(56) References Cited

U.S. PATENT DOCUMENTS

| 510,300 | A | * | 12/1893 | Stilwell | A47B 88/0014 212/166 |
| 3,345,679 | A | * | 10/1967 | Anderson | E05D 5/06 16/392 |
| 3,439,377 | A | * | 4/1969 | Bucholz | E05D 5/065 16/389 |
| 3,603,626 | A | * | 9/1971 | Whiteside | F16B 5/02 403/408.1 |
| 3,686,709 | A | * | 8/1972 | Tuvert | E05D 5/02 16/383 |
| 3,721,363 | A | * | 3/1973 | Bressler | F16J 13/06 16/230 |
| 3,881,220 | A | * | 5/1975 | Kiraly | E05D 5/065 16/391 |
| 3,916,480 | A | * | 11/1975 | Smith | E05D 5/04 16/383 |
| 4,048,898 | A | * | 9/1977 | Salter | F16B 5/02 29/446 |
| 4,141,109 | A | * | 2/1979 | Farrell | E05D 5/02 16/237 |

(Continued)

*Primary Examiner* — Jeffrey O'Brien
(74) *Attorney, Agent, or Firm* — Plager Schack LLP; Mark G. Plager; Eric Liou (57) ABSTRACT

A hinge assembly to pivotably mount a blind flange to a weld neck flange includes a front assembly having a front plate and a plurality of front link plates coupled to the front plate, the front plate having a plurality of openings, each opening in the front plate coupled to mechanical fasteners to secure the front plate to the blind flange, a rear assembly pivotably mounted to the front assembly and having a rear plate and a plurality of rear link plates coupled to the rear plate, the rear plate having a plurality of openings, each opening in the rear plate coupled to mechanical fasteners to secure the rear plate to the weld neck flange, each front link plate disposed between a pair of adjacent rear link plates, and a pin disposed through each front link plate and the pair of adjacent rear link plates.

10 Claims, 6 Drawing Sheets

(56) References Cited

U.S. PATENT DOCUMENTS

| | | | | |
|---|---|---|---|---|
| 4,297,072 | A | 10/1981 | Shah | |
| 4,398,649 | A * | 8/1983 | Labbe | B65D 90/10 220/327 |
| 4,519,519 | A | 5/1985 | Meuschke | |
| 4,669,628 | A * | 6/1987 | Hatta | B01J 3/002 220/211 |
| 4,702,658 | A * | 10/1987 | Salter | F16B 5/02 29/522.1 |
| 4,801,423 | A * | 1/1989 | Warren | G21C 11/02 250/515.1 |
| 4,865,513 | A | 9/1989 | Noris | |
| 4,932,553 | A * | 6/1990 | Reich, Jr. | F22B 37/221 250/517.1 |
| 4,974,989 | A * | 12/1990 | Salter | F16B 5/02 29/525 |
| 5,184,422 | A * | 2/1993 | Wade | B65D 90/10 404/25 |
| 5,394,650 | A * | 3/1995 | Dean | B65D 90/10 16/308 |
| 5,669,108 | A * | 9/1997 | Ferrari | F16B 12/32 16/383 |
| 7,051,897 | B2 * | 5/2006 | McGuire | B01J 3/03 220/234 |
| 7,896,187 | B2 * | 3/2011 | Haibel | F16J 13/08 220/233 |
| 7,931,168 | B2 * | 4/2011 | DePietro | B65D 90/10 16/248 |
| 8,251,243 | B2 * | 8/2012 | Haibel | B65D 90/10 220/213 |
| 8,297,463 | B2 * | 10/2012 | McQuaid | F16J 13/20 220/263 |
| 8,342,353 | B2 * | 1/2013 | Bartlett | B63C 11/32 128/205.26 |
| 8,596,484 | B1 * | 12/2013 | Haibel | F16J 13/18 220/262 |
| 8,596,697 | B1 * | 12/2013 | Haibel | F16J 13/12 220/298 |
| 8,802,023 | B1 * | 8/2014 | Lewis | A61L 2/00 277/628 |
| 9,394,734 | B1 * | 7/2016 | Berger | E05D 11/02 |
| 2006/0059662 | A1 * | 3/2006 | Roeper | E05D 5/06 16/382 |
| 2006/0219649 | A1 * | 10/2006 | Wolfford, Sr. | B66C 23/208 212/166 |
| 2008/0127565 | A1 * | 6/2008 | Taylor | E05D 5/06 49/394 |
| 2008/0256746 | A1 * | 10/2008 | Yuan | E05D 5/06 16/223 |
| 2010/0037892 | A1 * | 2/2010 | Bartlett | B63C 11/32 128/202.12 |
| 2013/0025209 | A1 * | 1/2013 | Lidster | F16J 13/08 49/359 |
| 2015/0308574 | A1 * | 10/2015 | Kegler | E05B 65/006 49/394 |

\* cited by examiner

HINGE ASSEMBLY TO PIVOTABLY MOUNT BLIND FLANGE TO PIPE WELD NECK FLANGE

BACKGROUND

The embodiments herein relate generally to a hinge assembly for supporting a blind flange used in various piping systems in the oil industry, heat exchangers, ships, tanks, and the like.

Medium to heavy-duty blind flanges are used to open and close piping in a variety of industries. In many applications, the blind flange serves as a cover that is pivotably mounted to a weld neck flange that is welded to a pipe end or opening. The weld neck flange comprises a central opening that is aligned with the interior opening of the pipe. The blind flange is swung open to access and/or perform maintenance on the pipe. These pipe components can be heavy and difficult to maneuver.

In many instances, a crane or alternative heavy lifting equipment is required to swing the blind flange open and closed. This is inefficient and a burden due to the additional requirement of using specialized equipment. There exist a variety of structures disclosed in U.S. Pat. Nos. 7,931,168, 4,519,519, 4,297,072 and 4,865,513, which disclose devices used to mount blind flanges, hatches, manway covers, and the like, to openings in pipes or other tubular structures. However, these devices are disadvantageous because they require the use of multiple parts that are complex and/or bulky. In addition, several of these devices require additional equipment such as booms or clamps. In addition, these existing mounting components are limited because they do not easily accommodate flanges having tolerances on the thickness.

As such, there is a need in the industry for a hinge assembly for use in pivotably mounting a blind flange to a pipe weld neck flange that overcomes the limitations of the prior art. There is a further need for a hinge assembly that can easily accommodate blind flanges and weld neck flanges having tolerances on the thickness. There is a further need for the hinge assembly to permit a user to manually open and close the blind flange relative to the pipe weld neck flange without the need for specialized equipment. There is a further need for a hinge assembly that will permanently remain on the blind and weld neck flanges to permit access to the pipeline or vessel to perform frequent maintenance.

SUMMARY

A hinge assembly for use with both blind flanges and weld neck flanges having tolerances on thickness is provided. The hinge assembly is configured to pivotably mount a blind flange to a weld neck flange coupled to an opening of a pipe. The hinge assembly comprises a front assembly comprising a front plate and a plurality of front link plates coupled to an edge of the front plate, the front plate comprising a plurality of openings, each opening in the plurality of openings in the front plate configured to be coupled to a first set of mechanical fasteners to secure the front plate to the blind flange, a rear assembly pivotably mounted to the front assembly, the rear assembly comprising a rear plate and a plurality of rear link plates coupled to an edge of the rear plate, the rear plate comprising a plurality of openings, each opening in the plurality of openings in the rear plate configured to be coupled to a second set of mechanical fasteners to secure the rear plate to the weld neck flange, each front link plate in the plurality of front link plates being disposed between a pair of adjacent rear link plates in the plurality of rear link plates, and a pin disposed through each front link plate and the pair of adjacent rear link plates, the pin configured to permit pivotal movement of the front assembly relative to the rear assembly to enable the blind flange to open and close relative to the weld neck flange.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
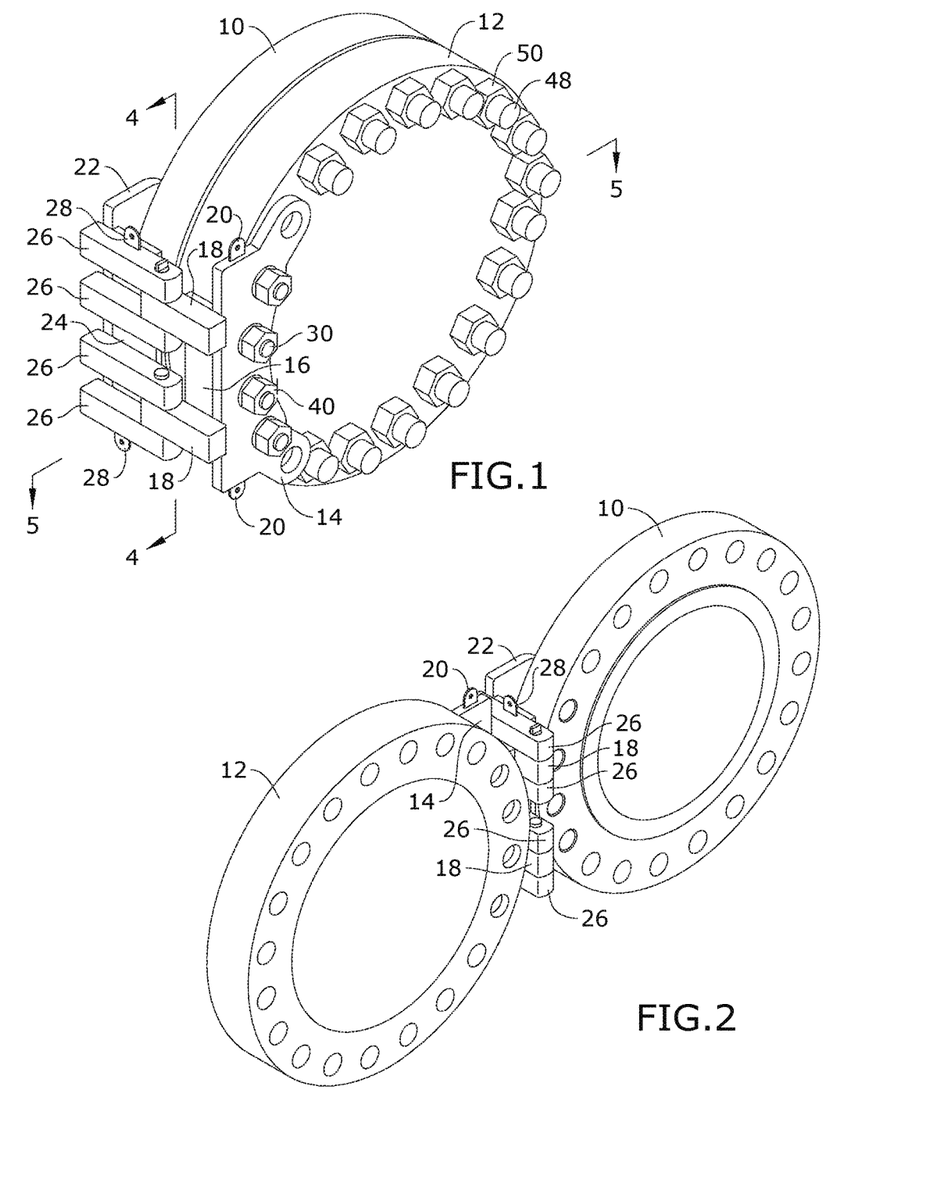
FIG. 1 depicts a perspective view of certain embodiments of the hinge assembly in use illustrating a closed position.
FIG. 2 depicts a perspective view of certain embodiments of the hinge assembly in use illustrating an open position.
Figure 3:
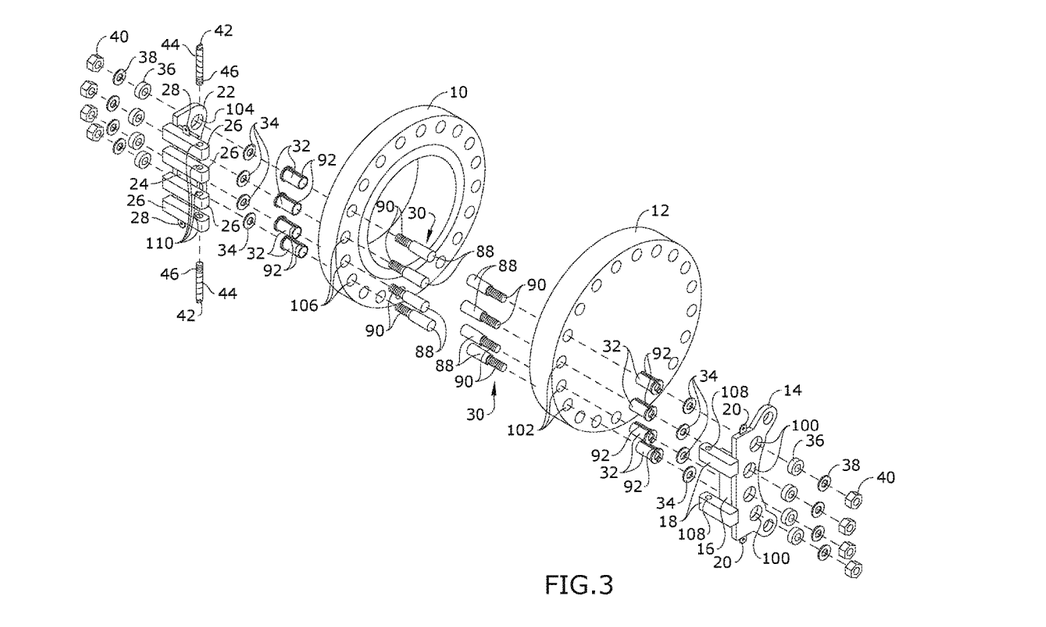
FIG. 3 depicts an exploded view of certain embodiments of the hinge assembly.

As depicted in FIGS. 1-3, the hinge assembly is configured to pivotably mount blind flange 12 to weld neck flange 10, which is welded to a pipe opening or end (not shown). In this embodiment, the hinge assembly is designed to be permanently affixed to blind flange 12 and weld neck flange 10. The hinge assembly is configured to permit blind flange 12 to swing to a closed position depicted in FIG. 1 to seal the pipe opening (not shown) or swing to an open position depicted in FIG. 2 to expose the pipe opening (not shown). In one embodiment, a gasket is disposed between inner faces of weld neck flange 10 and blind flange 12 to enhance the seal when the flanges are closed. The hinge assembly permits a user to manually swing blind flange 12 to the desired position without the need for additional specialized equipment.

In certain embodiments, the hinge assembly generally comprises a front assembly and a rear assembly, which are both preferably made from stainless steel, carbon steel, other metal, or alternative material known in the field. The front assembly comprises front hinge plate 14, front support plate 16 and front link plates 18. Similarly, the rear assembly comprises rear hinge plate 22, rear support plate 24 and rear link plates 26.

As depicted in FIG. 3, front hinge plate 14 comprises a plurality of openings 100 that are configured to align with openings 102 in blind flange 12. Front hinge plate 14, front support plate 16 and front link plates 18 are welded together.

In one embodiment, a pair of front link plates 18 are coupled to front hinge plate 14. However, an alternative number of front link plates 18 may be used instead. In one embodiment, front lifting lugs 20 are coupled to the top and bottom of front hinge plate 14. Similarly, rear hinge plate 22 comprises a plurality of openings 104 that are configured to align with openings 106 in weld neck flange 10. Rear hinge plate 22, rear support plate 24 and rear link plates 26 are welded together. In one embodiment, four rear link plates 26 are coupled to rear hinge plate 22. However, an alternative number of rear link plates 26 may be used. In one embodiment, a first rear lifting lug 28 is coupled to the top of one of the plurality of rear link plates 26 and a second rear lifting lug 28 is coupled to the bottom of another one of the plurality of rear link plates 26. Lifting lugs 20, 28 are used to help lift and maneuver the plates when securing them to blind and weld neck flanges 12, 10.

Figure 4:
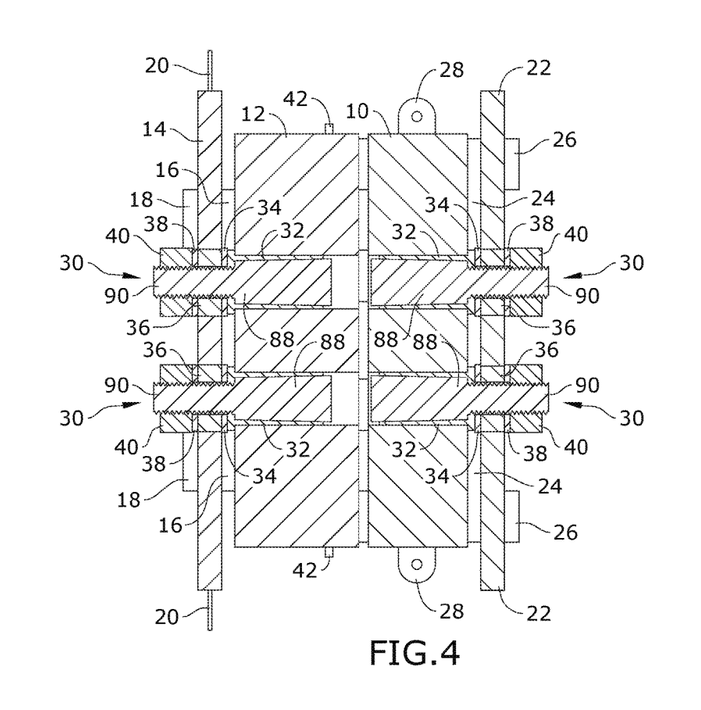
FIG. 4 depicts a section view of certain embodiments of the hinge assembly taken along line 4-4 in FIG. 1.
Figure 5:
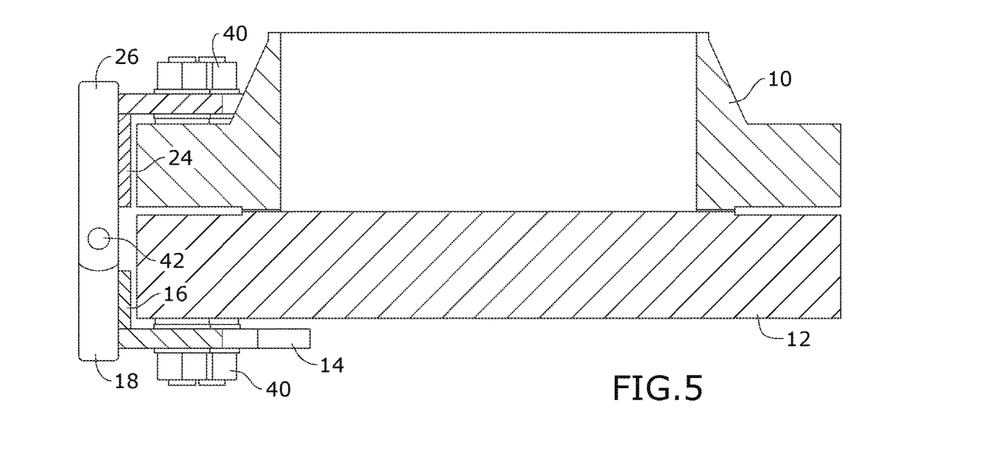
FIG. 5 depicts a section view of certain embodiments of the hinge assembly taken along line 5-5 in FIG. 1.

As depicted in FIGS. 3-5, front hinge plate 14 is coupled to blind flange 12 by a plurality of mechanical fasteners disposed through any number of openings 100 in front hinge plate 14 and corresponding openings 102 in blind flange 12. Each aligned pair of openings 100, 102 are secured in place by mechanical fasteners including tapered sleeve 32, tapered stud 30, shim washer 34, sleeve 36, washer 38 and nut 40.

Tapered sleeve 32 is disposed through opening 102 in blind flange 12 and comprises an inner tapered wall and slot 92. Slot 92 extends along the longitudinal axis of tapered sleeve 32 and permits expansion of the sleeve. Each tapered stud 30 comprises tapered portion 88 and threaded portion 90. Tapered portion 88 of tapered stud 30 is disposed within tapered sleeve 32 and conforms to the inner tapered wall of tapered sleeve 32. Threaded portion 90 of tapered stud 30 extends through opening 100 in front hinge plate 14. Shim washer 34 is disposed around threaded portion 90 and is in contact with both front hinge plate 14 and tapered sleeve 32. Sleeve 36 is disposed around threaded portion 90 of tapered stud 30 and positioned within opening 100 in front hinge plate 14. Washer 38 and nut 40 are disposed around threaded portion 90 of tapered stud 30 and tightened.

As nut 40 is tightened, the tapering geometry of tapered sleeve 32 undergoes radial expansion, which causes a radial force that maintains tapered sleeve 32 in position inside opening 102 of blind flange 12. The radial force exerts sufficient friction to maintain the front assembly securely connected to blind flange 12. In an exemplary installation, tapered sleeve 32 and tapered stud 30 are inserted within opening 102 in blind flange 12. Nut 40 is tightened on threaded portion 90 of tapered stud 30 to permit tapered sleeve 32 to radially expand inside opening 102 of blind flange 12. Once completed, nut 40 is removed from tapered stud 30 to permit the front assembly to be coupled to blind flange 12. Specifically, shim washer 34, sleeve 36, washer 38 and nut 40 are disposed around threaded portion 90 of tapered stud 30 as previously described and tightened.

In the same manner, rear hinge plate 22 is coupled to weld neck flange 10 by a plurality of mechanical fasteners disposed through any number of openings 104 in rear hinge plate 22 and corresponding openings 106 in weld neck flange 10. Each aligned pair of openings 104, 106 are secured in place by mechanical fasteners including tapered sleeve 32, tapered stud 30, shim washer 34, sleeve 36, washer 38 and nut 40.

Tapered sleeve 32 is disposed through opening 106 in weld neck flange 10. Each tapered stud 30 comprises tapered portion 88 and threaded portion 90. Tapered portion 88 of tapered stud 30 is disposed within tapered sleeve 32 and conforms to the inner tapered wall of tapered sleeve 32. The threaded portion 90 of tapered stud 30 extends through opening 104 in rear hinge plate 22. Shim washer 34 is disposed around threaded portion 90 and is in contact with both rear hinge plate 22 and tapered sleeve 32. Sleeve 36 is disposed around threaded portion 90 of tapered stud 30 and positioned within opening 104 in rear hinge plate 22. Washer 38 and nut 40 are disposed around threaded portion 90 of tapered stud 30 and tightened.

As nut 40 is tightened, the tapering geometry of tapered sleeve 32 undergoes radial expansion, which causes a radial force that maintains tapered sleeve 32 in position inside opening 106 of weld neck flange 10. The radial force exerts sufficient friction to maintain the rear assembly securely connected to weld neck flange 10. The components of the rear assembly are installed to weld neck flange 10 in the same manner as the exemplary installation of coupling the front assembly to blind flange 12 previously described. To accommodate the gap due to flange thickness tolerance between tapered sleeve 32 and front or rear hinge plates 14, 22, shim washer 34 with different thicknesses such as ¹⁄₁₆", ⅛", ¼" are used for each set of tapered studs 30.

The front and rear assemblies are pivotably mounted together by hinge pins 42. Each front link plate 18 is disposed between an adjacent pair of rear link plates 26. This is performed to enable pin hole 108 of front link plate 18 to align with pin holes 110 of the adjacent pair of rear link plates 26. Hinge pin 42 is disposed through pin holes 108, 110 to pivotably mount each set of front and rear link plates 18, 26 together. In the final assembly, a pair of hinge pins 42 are used to secure the upper and lower sets of front and rear link plates 18, 26. Each hinge pin 42 comprises oil grooves 44 and pin threads 46. Oil grooves 44 of hinge pin 42 permit a uniform lubrication throughout to permit front hinge plate 14 to easily pivot relative to rear hinge plate 22. Pin threads 46 of hinge pins 42 engage with internal threads of pin holes 110 in the middle rear link plates 26. Pin threads 46 of each hinge pin 42 extend out of rear link plate 26 by approximately ½". Each hinge pin 42 comprises a flat end that serves to tighten the pin by variable spanner, wrench or other hand tool. In the assembled configuration, the hinge assembly permits a user to manually swing blind flange 12 relative to weld neck flange 10 with ease to a closed position depicted in FIG. 1 or an open position depicted in FIG. 2.

It shall be appreciated that the hinge assembly depicted in FIGS. 1-5 is designed to permanently remain on the flange. This is beneficial for applications where the pipeline or vessel (not shown) connected to weld neck flange 10 has to be frequently accessed for maintenance. In one embodiment, when the flanges are not in operation, a spacer (not shown) may be used to fill the gap between the outer surface of the flange and the inner surface of the hinge plate. In this configuration, tapered studs 30, tapered sleeves 32, shim washers 34, sleeves 36 and hinge pins 42 are removed.

Figure 6:
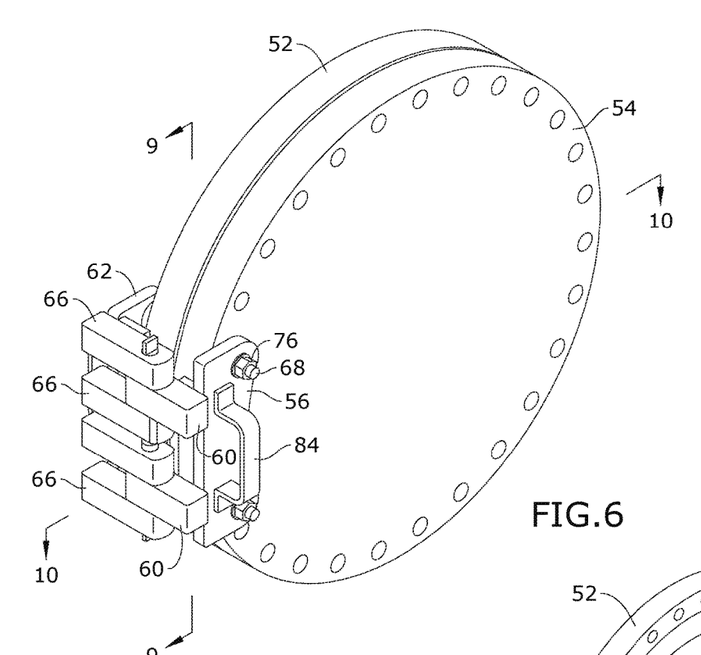
FIG. 6 depicts a perspective view of an alternative embodiment of the hinge assembly shown in use illustrating a closed position.
Figure 7:
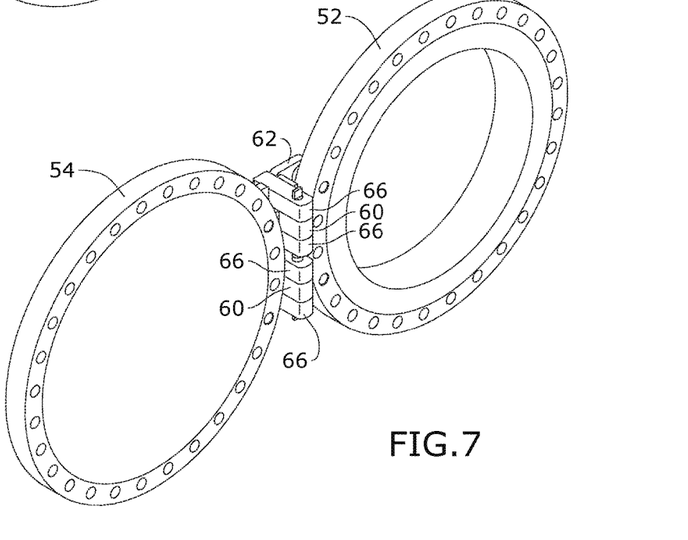
FIG. 7 depicts a perspective view of the alternative embodiment of the hinge assembly in use illustrating an open position.
Figure 8:
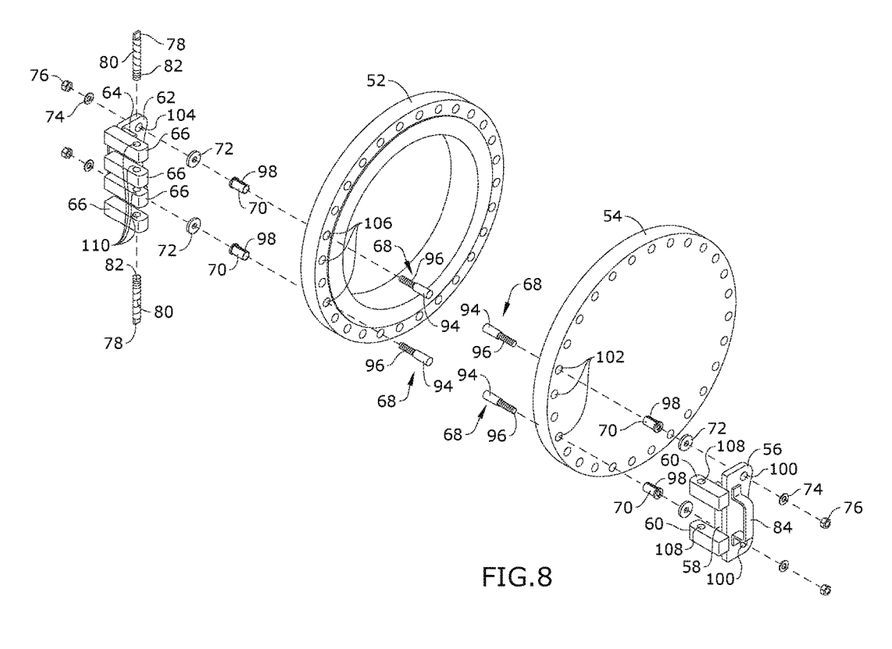
FIG. 8 depicts an exploded view of the alternative embodiment of the hinge assembly.

FIGS. 6-8 depict an alternate embodiment of the hinge assembly, which comprises components substantially similar to the hinge assembly disclosed in FIGS. 1-5 and operates in a similar manner. The alternate hinge assembly is configured to pivotably mount alternate blind flange 54 to alternate weld neck flange 52, which is welded to a pipe opening or end (not shown). In this embodiment, the alternate hinge assembly is designed to be easily attached and removed from alternate blind flange 54 and alternate weld neck flange 52 after operation.

The alternate hinge assembly is configured to permit alternate blind flange 54 to swing to a closed position depicted in FIG. 6 to seal the pipe opening (not shown) or swing to an open position depicted in FIG. 7 to expose the pipe opening (not shown). The alternate hinge assembly permits a user to manually swing alternate blind flange 54 to the desired position without the need for additional specialized equipment.

In certain embodiments, the hinge assembly generally comprises a front assembly and a rear assembly, which are both preferably made from stainless steel, carbon steel, other metal, or alternative material known in the field. The front assembly comprises front hinge plate 56, front support plate 58 and front link plates 60. Similarly, the rear assembly comprises rear hinge plate 62, rear support plate 64 and rear link plates 66.

Figure 9:
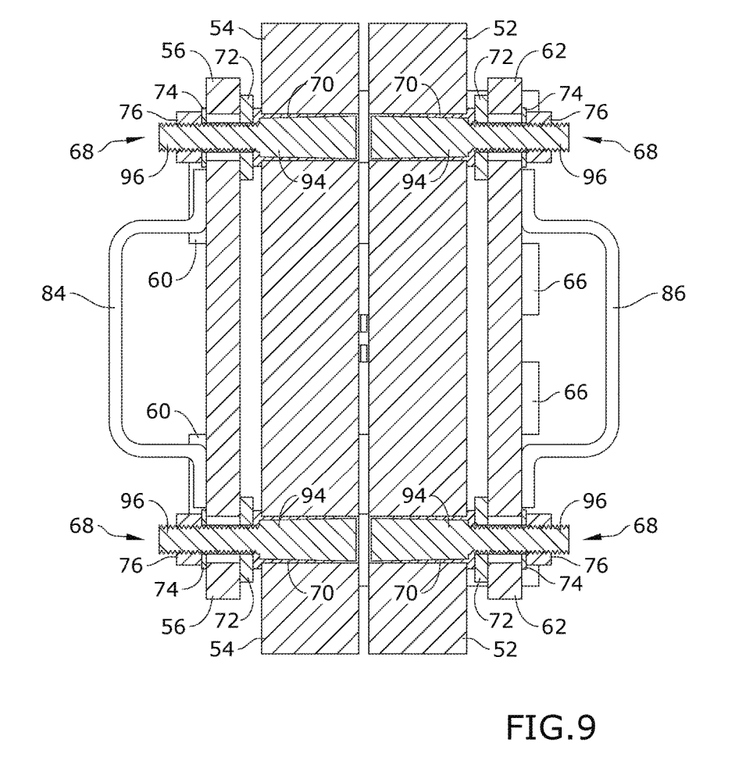
FIG. 9 depicts a section view of the alternative embodiment of the hinge assembly taken along line 9-9 in FIG. 6.
Figure 10:
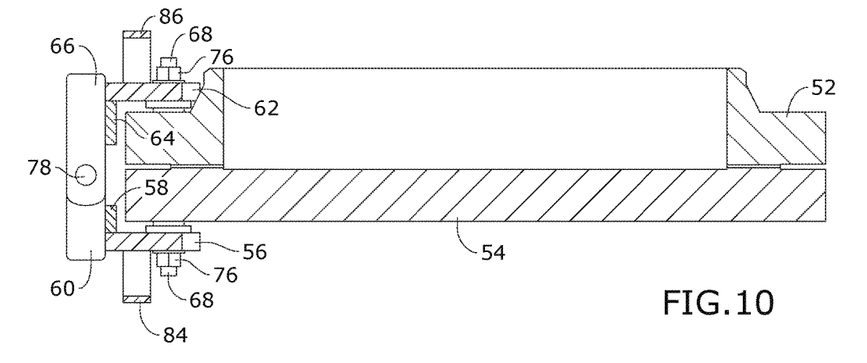
FIG. 10 depicts a section view of the alternative embodiment of the hinge assembly taken along line 10-10 in FIG. 6.

As depicted in FIGS. 8-10, front hinge plate 56 comprises a plurality of openings 100 that are configured to align with openings 102 in alternate blind flange 54. Front hinge plate 56, front support plate 58 and front link plates 60 are welded together. In one embodiment, front handle 84 is coupled to front hinge plate 56. Similarly, rear hinge plate 62 comprises a plurality of openings 104 that are configured to align with openings 106 in alternate weld neck flange 52. Rear hinge plate 62, rear support plate 64 and rear link plates 66 are welded together. In one embodiment, four rear link plates 66 are coupled to rear hinge plate 62. However, an alternative number of rear link plates 66 may be used. In one embodiment, rear handle 86 is coupled to rear hinge plate 62. Front and rear handles 84, 86 of front and rear hinge plates 56, 62 are used to help lift and maneuver the plates when securing them to alternate blind and weld neck flanges 54, 52. If the front or rear hinge assembly is greater than 40 kg, lifting lugs 20, 28 are coupled to the front or rear hinge assembly instead of front handle 84 and rear handle 86.

Front hinge plate 56 is coupled to alternate blind flange 54 by a plurality of mechanical fasteners disposed through any number of openings 100 in front hinge plate 56 and corresponding openings 102 in alternate blind flange 54. Each aligned pair of openings 100, 102 are secured in place by mechanical fasteners including tapered sleeve 70, tapered stud 68, shim washer 72, washer 74 and nut 76.

Tapered sleeve 70 is disposed through opening 102 in alternate blind flange 54 and comprises an inner tapered wall and slot 98. Slot 98 extends along the longitudinal axis of tapered sleeve 70 and permits expansion of the sleeve. Each tapered stud 68 comprises tapered portion 94 and threaded portion 96. Tapered portion 94 of tapered stud 68 is disposed within tapered sleeve 70 and conforms to the inner tapered wall of tapered sleeve 70. The threaded portion 96 of tapered stud 68 extends though opening 100 in front hinge plate 56. Shim washer 72 is disposed around threaded portion 96 and in contact with both front hinge plate 56 and tapered sleeve 70. Washer 74 and nut 76 are disposed around threaded portion 96 of tapered stud 68 and tightened.

As nut 76 is tightened, the tapering geometry of tapered sleeve 70 undergoes radial expansion, which causes a radial force that maintains tapered sleeve 70 in position inside opening 102 of alternate blind flange 54. The radial force exerts sufficient friction to maintain the front assembly securely connected to alternate blind flange 54. In an exemplary installation, tapered sleeve 70 and tapered stud 68 are inserted within opening 102 in alternate blind flange 54. Nut 76 is tightened on threaded portion 96 of tapered stud 68 to permit tapered sleeve 70 to radially expand inside opening 102 of alternate blind flange 54. Once completed, nut 76 is removed from tapered stud 68 to permit the front assembly to be coupled to alternate blind flange 54. Specifically, shim washer 72, washer 74 and nut 76 are disposed around threaded portion 96 of tapered stud 68 as previously described and tightened.

In the same manner, rear hinge plate 62 is coupled to alternate weld neck flange 52 by a plurality of mechanical fasteners disposed through any number of openings 104 in rear hinge plate 62 and corresponding openings 106 in alternate weld neck flange 52. Each aligned pair of openings 104, 106 are secured in place by mechanical fasteners including tapered sleeve 70, tapered stud 68, shim washer 72, washer 74 and nut 76.

Tapered sleeve 70 is disposed through opening 106 in alternate weld neck flange 52. Each tapered stud 68 comprises tapered portion 94 and threaded portion 96. Tapered portion 94 of tapered stud 68 is disposed within tapered sleeve 70 and conforms to the inner tapered wall of tapered sleeve 70. Threaded portion 96 of tapered stud 68 extends through opening 104 in rear hinge plate 62. Shim washer 72 is disposed around threaded portion 96 and in contact with both rear hinge plate 62 and tapered sleeve 70. Washer 74 and nut 76 are disposed around threaded portion 96 of tapered stud 68 and tightened.

As nut 76 is tightened, the tapering geometry of tapered sleeve 70 undergoes radial expansion, which causes a radial force that maintains tapered sleeve 70 in position inside opening 106 of alternate weld neck flange 52. The radial force exerts sufficient friction to maintain the rear assembly securely connected to alternate weld neck flange 52. The components of the rear assembly are installed to alternate weld neck flange 52 in the same manner as the exemplary installation of coupling the front assembly to alternate blind flange 54 previously described. To accommodate the gap due to flange thickness tolerance between tapered sleeve 70 and front or rear hinge plates 56, 62, shim washer 72 with different thicknesses such as $1/16$", $1/8$", $1/4$" are used for each set of tapered studs 68.

The front and rear assemblies are pivotably mounted together by hinge pins 78. Each front link plate 60 is disposed between an adjacent pair of rear link plates 66. This is performed to enable pin hole 108 of front link plate 60 to align with pin holes 110 of the adjacent pair of rear link plates 66. Hinge pin 78 is disposed through pin holes 108, 110 to pivotably mount each set of front and rear link plates 60, 66 together. In the final assembly, a pair of hinge pins 78 are used to secure the upper and lower sets of front and rear link plates 60, 66. Each hinge pin 78 comprises oil grooves 80 and pin threads 82. Oil grooves 80 of hinge pin 78 permit a uniform lubrication throughout to permit front hinge plate 56 to easily pivot relative to rear hinge plate 62. Pin threads 82 of hinge pins 78 engage with internal threads of pin holes 110 in the middle rear link plates 66. Pin threads 82 of each hinge pin 78 extend out of rear link plate 66 by approximately $1/2$". Each hinge pin 78 comprises a flat end that serves to tighten the pin by variable spanner, wrench or other hand tool. In the assembled configuration, the hinge assembly permits a user to manually swing alternate blind flange 54 relative to alternate weld neck flange 52 with ease to a closed position depicted in FIG. 6 or an open position depicted in FIG. 7.

It shall be appreciated that the components of the hinge assembly described in several embodiments herein may comprise any alternative known materials in the field and be of any color, size and/or dimensions. It shall be appreciated that the components of the hinge assembly described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A hinge assembly for use with both blind flanges and weld neck flanges having tolerances on thickness, the hinge assembly pivotably connecting a blind flange to a weld neck flange coupled to an opening of a pipe, the hinge assembly comprising:

a front assembly comprising a front plate, a first support plate directly coupled to a side edge of the front plate, and a plurality of front link plates directly coupled to the first support plate, the front plate extending in a first plane and the first support plate extending within a second plane, the first plane being oriented generally perpendicular to the second plane, the front plate comprising a plurality of openings, each opening in the plurality of openings in the front plate coupled to a first set of mechanical fasteners to secure the front plate to the blind flange;

a rear assembly pivotably mounted to the front assembly, the rear assembly comprising a rear plate, a second support plate directly coupled to a side edge of the rear plate, and a plurality of rear link plates directly coupled to the second support plate, the rear plate extending in a third plane and the second support plate extending within a fourth plane, the third plane oriented generally perpendicular to the fourth plane, the rear plate comprising a plurality of openings, each opening in the plurality of openings in the rear plate coupled to a second set of mechanical fasteners to secure the rear plate to the weld neck flange, each front link plate in the plurality of front link plates being disposed between a pair of adjacent rear link plates in the plurality of rear link plates; and a pin disposed through each front link plate and the pair of adjacent rear link plates, the pin configured to permit pivotal movement of the front assembly relative to the rear assembly to enable the blind flange to open and close relative to the weld neck flange;

wherein the front assembly is configured to pivotably adjust relative to the rear assembly to a closed position with the first and third planes parallel to each other and the second and fourth planes coplanar relative to each other, wherein the front assembly is configured to pivotably adjust relative to the rear assembly to an open position with the first and third planes coplanar relative to each other and the second and fourth planes parallel to each other.

2. The hinge assembly of claim 1, wherein the front plate is configured to pivot up to 180 degrees relative to the rear plate.

3. The hinge assembly of claim 2, wherein the first set of fasteners comprises a first tapered sleeve and a first stud, the first tapered sleeve disposed within one opening in a plurality of openings in the blind flange, the first stud comprising a tapered portion disposed within the first tapered sleeve and a threaded portion extending through one of the plurality of openings in the front plate, wherein the second set of fasteners comprises a second tapered sleeve and a second stud, the second tapered sleeve disposed within one opening in a plurality of openings in the weld neck flange, the second stud comprising a tapered portion disposed within the second tapered sleeve and a threaded portion extending through one of the plurality of openings in the rear plate.

4. The hinge assembly of claim 3, wherein each tapered sleeve of the first and second tapered sleeves comprises a slot extending along a longitudinal axis of the tapered sleeve, the slots configured to permit expansion of the first and second tapered sleeves.

5. The hinge assembly of claim 4, wherein the first set of fasteners comprises a first shim washer, a first sleeve, a first washer and a first nut, the first shim washer disposed around the threaded portion of the first stud and positioned between the first tapered sleeve and the front plate, the first sleeve, the first washer and the first nut being coupled to the threaded portion of the first stud, wherein the second set of fasteners comprises a second shim washer, a second sleeve, a second washer and a second nut, the second shim washer disposed around the threaded portion of the second stud and positioned between the second tapered sleeve and the rear plate, the second sleeve, the second washer and the second nut being coupled to the threaded portion of the second stud.

6. The hinge assembly of claim 5, further comprising a first lifting lug coupled to the front plate and a second lifting lug coupled to one of the plurality of rear link plates.

7. The hinge assembly of claim 6, wherein each pin comprises a threaded portion and an oil groove portion.

8. A hinge assembly for use with both blind flanges and weld neck flanges having tolerances on thickness, the hinge assembly pivotably connecting a blind flange to a weld neck flange coupled to an opening of a pipe, the hinge assembly comprising:

a front assembly comprising a front plate, a first support plate directly coupled to a side edge of the front plate, and a plurality of front link plates directly coupled to the first support plate, the front plate extending in a first plane and the first support plate extending within a second plane, the first plane being oriented generally perpendicular to the second plane, the front plate comprising a plurality of openings, each opening in the plurality of openings in the front plate coupled to a first set of mechanical fasteners to secure the front plate to the blind flange;

a rear assembly pivotably mounted to the front assembly, the rear assembly comprising a rear plate, a second support plate directly coupled to a side edge of the rear plate, and a plurality of rear link plates directly coupled to the second support plate, the rear plate extending in a third plane and the second support plate extending within a fourth plane, the third plane oriented generally perpendicular to the fourth plane, the rear plate comprising a plurality of openings, each opening in the plurality of openings in the rear plate coupled to a second set of mechanical fasteners to secure the rear plate to the weld neck flange, each front link plate in the plurality of front link plates being disposed between a pair of adjacent rear link plates in the plurality of rear link plates;

a first handle coupled to the front plate;

a second handle coupled to the rear plate; and a pin disposed through each front link plate and the pair of adjacent rear link plates, the pin configured to permit pivotal movement of the front assembly relative to the rear assembly to enable the blind flange to open and close relative to the weld neck flange;

wherein the front assembly is configured to pivotably adjust relative to the rear assembly to a closed position with the first and third planes parallel to each other and the second and fourth planes coplanar relative to each other, wherein the front assembly is configured to pivotably adjust relative to the rear assembly to an open position with the first and third planes coplanar relative to each other and the second and fourth planes parallel to each other.

9. The hinge assembly of claim 8, wherein the first set of fasteners comprises a first tapered sleeve and a first stud, the first tapered sleeve disposed within one opening in a plurality of openings in the blind flange, the first stud comprising a tapered portion disposed within the first tapered sleeve and a threaded portion extending through one of the plurality of openings in the front plate, wherein the second set of fasteners comprises a second tapered sleeve and a second stud, the second tapered sleeve disposed within one opening in a plurality of openings in the weld neck flange, the second stud comprising a tapered portion disposed within the second tapered sleeve and a threaded portion extending through one of the plurality of openings in the rear plate.

10. The hinge assembly of claim 9, wherein the first set of fasteners comprises a first shim washer, a first washer and a first nut, the first shim washer disposed around the threaded portion of the first stud and positioned between the first tapered sleeve and the front plate, the first washer and the first nut being coupled to the threaded portion of the first stud, wherein the second set of fasteners comprises a second shim washer, a second washer and a second nut, the second shim washer disposed around the threaded portion of the second stud and positioned between the second tapered sleeve and the rear plate, the second washer and the second nut being coupled to the threaded portion of the second stud.

* * * * *